US006945922B2

(12) United States Patent
Baggot et al.

(10) Patent No.: US 6,945,922 B2
(45) Date of Patent: Sep. 20, 2005

(54) SYSTEM FOR CUTTING A MOVING WEB IN THE CROSS DIRECTION TO FORM SHEETS OF A GIVEN LENGTH AT HIGH WEB SPEEDS

(75) Inventors: James L. Baggot, Menasha, WI (US); Ron F. Gropp, St. Catharines (CA); Steve Wojcik, Little Chute, WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/997,720

(22) Filed: Nov. 30, 2001

(65) Prior Publication Data

US 2003/0104912 A1 Jun. 5, 2003

(51) Int. Cl.[7] ................................................. B31B 7/14
(52) U.S. Cl. ......................... 493/63; 493/194; 493/227
(58) Field of Search .............................. 493/86, 82, 83, 493/63, 194, 199, 212, 227, 238, 239, 355, 74, 65

(56) References Cited

U.S. PATENT DOCUMENTS

| | | | |
|---|---|---|---|
| 4,422,588 A | | 12/1983 | Nowisch |
| 4,672,168 A | * | 6/1987 | Saunders et al. ........ 219/121.7 |
| 4,775,110 A | | 10/1988 | Welp et al. |
| 4,782,208 A | * | 11/1988 | Withrow et al. |
| 5,092,533 A | | 3/1992 | Gangemi |
| 5,213,649 A | | 5/1993 | Sepavich et al. |
| 5,330,125 A | | 7/1994 | Dylla |
| 5,444,035 A | | 8/1995 | Perrington et al. |
| 5,444,210 A | * | 8/1995 | Bingener et al. |
| 5,556,826 A | | 9/1996 | Perrington et al. |
| 5,684,617 A | | 11/1997 | Langhans |
| 5,755,654 A | | 5/1998 | Schulz et al. |
| 6,010,090 A | | 1/2000 | Bushmaker et al. |
| 6,038,487 A | | 3/2000 | Balster et al. |
| 6,427,420 B1 | * | 8/2002 | Olivieri et al. ............. 493/212 |

FOREIGN PATENT DOCUMENTS

| | | |
|---|---|---|
| DE | 4218272 A1 | 10/1992 |
| DE | 19928848 | 12/2000 |
| EP | 0881024 A1 | 12/1998 |
| FR | 2733447 A1 | 4/1995 |
| JP | 54081596 | 6/1979 |
| WO | 0037344 | 6/2000 |

OTHER PUBLICATIONS

PCT Search Report Dec. 17, 2002.
KINETIC Operating Principles of the Kinetic High Speed Perforating Blade, pp. 1–9.

* cited by examiner

Primary Examiner—Sameh H. Tawfik
(74) Attorney, Agent, or Firm—Dority & Manning, P.A.

(57) ABSTRACT

A system, apparatus and method is provided for perforating a web such as a paper tissue or paper toweling into distinct and perforated sheets. The invention provides a laser array capable of providing an incident beam of light upon the surface of the web. The web travels at relatively high speed on a web support mechanism. The web is contacted by the laser light source, which is directed at predetermined locations upon the web to provide a perforation or severing of the web. The employment of a laser in the practice of the invention provides the ability to precisely measure and vary the length of the perforations along the web in a more efficient manner, for a precise cut.

13 Claims, 2 Drawing Sheets

SYSTEM FOR CUTTING A MOVING WEB IN THE CROSS DIRECTION TO FORM SHEETS OF A GIVEN LENGTH AT HIGH WEB SPEEDS

BACKGROUND OF THE INVENTION

Products manufactured from webs such as paper toweling, paper tissue and the like typically are perforated to facilitate the tearing of sheets from a roll. Perforations may be formed using mechanical apparatus. In conventional operations, a moving blade is employed to perforate a traveling paper web. As the paper web passes between the moving blade and a stationary anvil, the blade is positioned perpendicular to the traveling paper web. As the paper web moves, the blade rubs against the anvil to perforate the paper. This process occurs at relatively high speed.

A knife roll having machined grooves also may be employed in the perforating process. A perforating blade may be provided in each groove. Such blades may be mounted in rows along the periphery of the knife roll. The distance between blade rows corresponds to the distance between perforations on the web. Bonding areas or "bonds" are formed upon the web by slots in the perforating blade. As the blade rubs against the paper web on the stationary anvil, the blade cuts the paper web at points where the blade touches the paper web. Slots in the blade prevent certain areas of the paper web from being cut. The uncut areas bond the paper, preventing the paper from tearing entirely.

Several U.S. patents disclose means of imparting perforations to a roll of paper. U.S. Pat. No. 6,010,090 to Bushmaker et al. discloses an elongated web of paper perforated along a plurality of transverse lines to provide bands of web areas having relatively high tensile strength.

U.S. Pat. No. 5,755,654 to Schulz et al. is directed to an apparatus and method for pinch perforating a multi-ply web material to increase the perforation ply bond retention. A roll mounted perforator blade cooperates with a beveled anvil to produce perforation ply bonds perpendicular to the length of the multiple plies of web material.

There are drawbacks to currently known methods for perforating web or paper sheet materials. Forces generated between the blade and anvil sometimes cause vibrations which are detrimental to the overall processing of the web. Furthermore, there are relatively strict speed limitations using currently available mechanical mechanisms. At fast web processing speeds, unacceptably high levels of vibration may be generated, which may cause imperfections, web breaks or machine malfunctions. High levels of vibration between the perforation roll and the head are undesirable.

One disadvantage of current equipment designs is that such designs cannot quickly be changed to accommodate different sheet lengths on a roll without expending large amounts of time and effort to reconfigure or change out mechanical equipment. To change sheet length on a roll of paper which is being manufactured, the papermaking apparatus typically must be stopped, and a 3–4 hour procedure of changing out and re-adjusting equipment is sometimes necessary. Furthermore, periodic replacement of blades causes lost production and down time. Such down time is costly in terms of manpower and lost production.

What is needed in the industry is a system, apparatus and method of severing or perforating a web of material in a way that does not result in equipment vibration or failure at high web processing speeds. A system that is capable of severing or perforating a web in a manner that requires less equipment maintenance would be desirable. A system that does not require numerous blade changes, and is capable of cutting or perforating a web at fast processing speeds would be desirable. Furthermore, a system that is capable of changing bond patterns, sheet lengths, and the material weight to be severed in a short period of time would be desirable.

SUMMARY OF THE INVENTION

An apparatus, system and method for perforating or severing a web is provided. The system comprises a mechanism for supporting a web at a predetermined distance from a laser. The mechanism may be comprised of rollers, an air foil, a carrier fabric or other means which is capable of suspending a web. The mechanism provides a web conveying means, which may be in any form that is capable of supporting and conveying the web. The web may be supported for severing across an open span supported between two rollers. Alternatively, an air foil could be employed to maintain a relatively constant tension upon the web. Other mechanisms are possible as well.

The web is adapted for traveling upon the surface of the carrier fabric. A frame also is provided, and at least one laser is mounted upon the frame. The laser is configured for directing a beam of light upon the surface of the running web. A severed portion is created upon the web. In some applications of the invention, the web is severed in a discontinuous line from a first edge to the second edge to form a "dashed line" perforation. Bonded portions may be situated between severed portions in the perforation line. Multiple perforation lines may be provided at spaced intervals upon the web.

The system in other embodiments may provide a plurality of lasers in which each laser acts upon the web. The web may be divided into a plurality of zones. A plurality of lasers may be provided in an array whereby each laser is assigned to a specific zone. The array could be oriented in the cross direction from the first edge to the second edge of the web. In some applications of the invention, each successive laser in the array is directed to provide a light beam upon a corresponding zone of the web.

BRIEF DESCRIPTION OF THE DRAWINGS

A full and enabling disclosure of this invention, including the best mode shown to one of ordinary skill in the art, is set forth in this specification. The following Figures illustrate the invention.

DETAILED DESCRIPTION OF THE INVENTION

Figure 1:
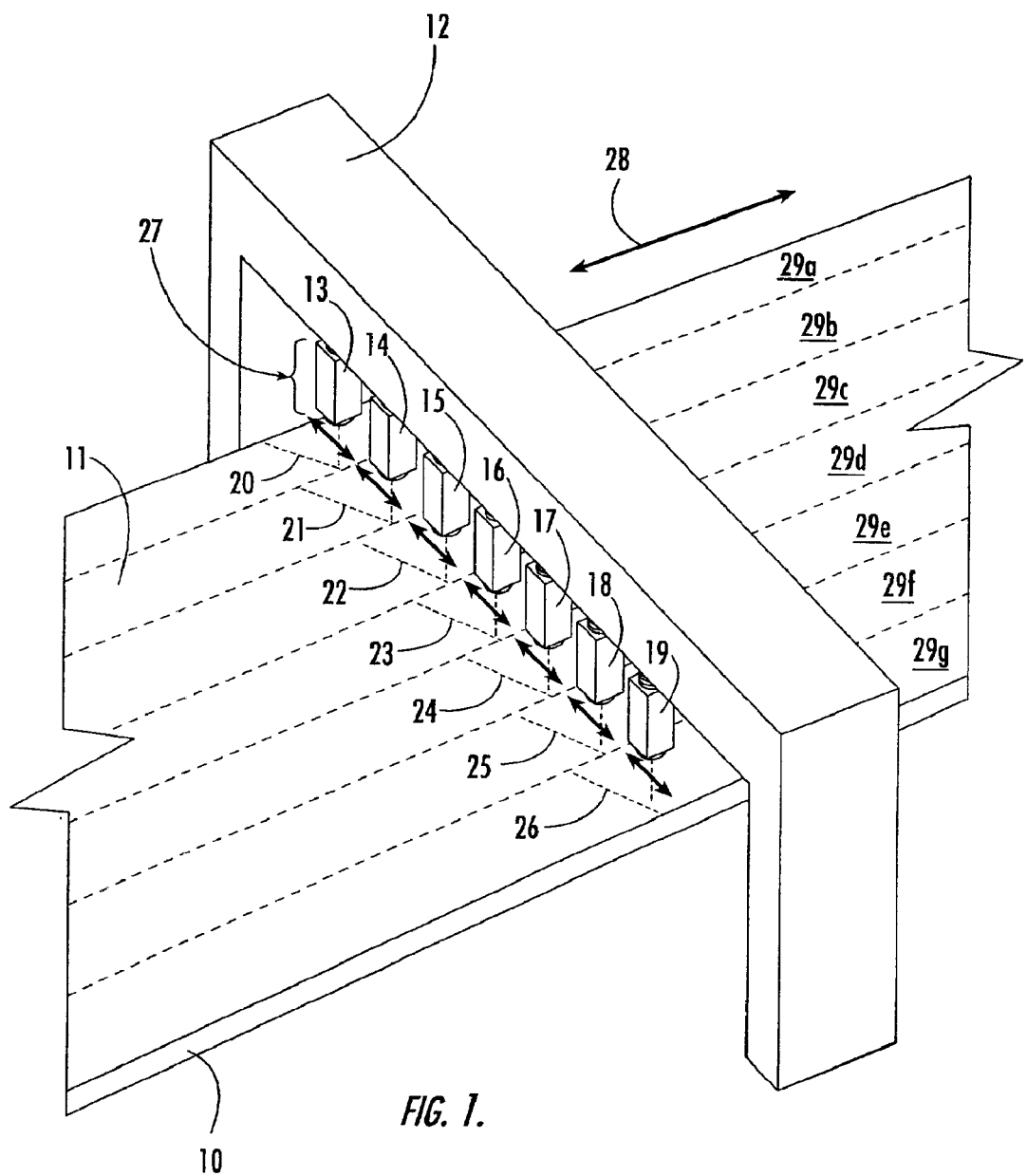
FIG. 1 is a perspective view of the system and apparatus of the invention that is capable of perforating or severing a traveling web.

Reference now will be made to the embodiments of the invention, one or more examples of which are set forth below. Each example is provided by way of explanation of the invention, not as a limitation of the invention. In fact, it will be apparent to those skilled in the art that various modifications and variations can be made in this invention without departing from the scope or spirit of the invention. For instance, features illustrated or described as part of one embodiment can be used on another embodiment to yield a still further embodiment. Thus, it is intended that the present invention cover such modifications and variations as come within the scope of the appended claims and their equivalents. Other objects, features and aspects of the present invention are disclosed in or are obvious from the following detailed description. It is to be understood by one of ordinary skill in the art that the present discussion is a description of exemplary embodiments only, and is not intended as limiting the broader aspects of the present invention, which broader aspects are embodied in the exemplary constructions.

In the practice of the invention, one or more laser beams may be used to cut or burn away material of a web to form perforations in the web, or even to sever the web completely in some applications. The material upon which the laser light beam is directed may be paper, textile or any other material. One advantage of using a laser as compared to mechanical perforating or severing mechanisms is the ability to readily and quickly change the length between perforations provided along a sheet. Furthermore, using a laser for cutting affords the opportunity to adjust the distance provided between perforations readily without the need to change physical hardware. Furthermore, lasers may facilitate the cutting of material to provide better control of the width and shape of the cut portion in the web material. A large number of style or cut patterns may be employed using lasers.

In the practice of the invention, it is possible to perforate webs, including paper tissue, paper towel, and other base sheets. The width of the web may be about 102 inches, but web widths as great as 204 inches, and as little as 4 inches, can be used. In the practice of the invention, it is possible to employ web speeds up to and in excess of 4000 ft./min. Furthermore, in other applications, web speeds of 5000–6000 feet per minute could be employed. In other aspects of the invention, web speeds of greater than 6000 feet per minute can be used, depending upon the characteristics of the laser light beam and electronic control system employed in the invention.

The system is capable of producing sheet lengths in the machine direction of as little as 4 inches or less, or as much as 15 inches, or more. Paper towels and the like typically include sheet lengths of about 10–15 inches, while paper bath tissue customarily uses a sheet length of between about 3 and about 6 inches. In the practice of the invention, it is possible to implement a change in sheet length using a real time adjustment of the laser beam positioning system, which is typically controlled by an electronic control system.

It is possible by simply adjusting the electronic control system of the laser array to adjust in real time, and almost instantly, the sheet length provided for web products manufactured according to the invention. The electronic control system may include controls for varying the speed of the laser beam, the on/off pattern in the machine cross direction, and the angle of beam travel relative to the moving web as the machine or web speed varies. The control system also may control the distance between perforations (i.e. sheet length). The control system also may provide a feature to register the perforation to the cut-off for transfer of the web from one wound log to the next.

To perforate the web it may be necessary to direct a laser at an angle to the moving web. This occurs because the web is moving at a high speed, and the laser usually must be directed at an angle to effect a perforation line across the web which becomes approximately perpendicular to the web in the cross direction. The size and strength of the laser employed is selected to provide for cutting speeds as great as 5600 ft./minute, based upon a 45° angle diagonal laser direction.

In one embodiment of the invention, it may be possible to employ a 125 watt $CO_2$ laser at web speeds of about 200 inches/sec. (i.e., about 1000 ft./min.). In other applications, a 240 watt laser could be employed at web processing speeds of about 436 inches/sec., which is equivalent to about 2180 ft./min. Other lasers having greater (or lesser) power can be employed as well. These laser types are provided merely as examples, and the invention is not limited to any particular laser power level or laser configuration.

Lasers employed in the practice of the invention may be obtained from essentially any laser manufacturer or supplier. Lasers manufactured by LasX Industries, Inc. of White Bear Lake, Minn. may be configured for the practice of the invention. Laser models that can be employed in the practice of the invention include the LPM-100 by LasX Industries, which provides an output power of about 100 watts and a power range of between about 10 and about 100 watts. The LPM-100 is a sealed $CO_2$ laser. Another laser model manufactured by LasX Industries that may be employed in the practice of the invention is the LPM-250, which is a 250 watt laser having a power range of between about 10 and about 250 watts. A third model manufactured by LasX Industries is the LPM-500, which is a 500 watt laser. The particular laser used in any given application will depend upon energy requirements and processing speeds employed in the practice of the invention, and the structural integrity and composition of the web to which the laser is directed.

Other lasers that may be employed in practicing the invention may be manufactured and distributed by SYNRAD, Inc. of Mukilteo, Wash., Edgewise Tools of Seattle, Wash., and Laser Machining, Inc. of Somerset, Wis.

A laser processing unit consists of a low maintenance laser source, a motion system and a control system. It is possible to integrate a laser processing unit into existing or new production lines, and they may be electronically integrated into a manufacturing line.

The laser motion control provided in the system could act so that most or all of the lasers move together simultaneously, in a similar manner and pattern of movement. They could, for example, act in unison, each replicating the motion of the others. However, other configurations could allow independent movement of each laser of the array. A signal from the main drive of the machine could be used in connection with a disk opening to control the speed and/or angle of movement of the lasers. Thus, control of laser motion from the main drive could be accomplished.

Secondary control in the system of the invention could include a cut-off and transfer from log to log. There is a need to provide the perforation formed by the laser light beam in timed sequence with the cut-off/transfer. To achieve registration, it would be possible to provide encoders on the bedroll that assist in the cut-off/transfer operation. The motion controls can be registered so that the actual perforation line from the laser to the signal, from the encoders that designates the bedroll cut-off mechanism position, facilitates the cut-off/transfer step for each revolution of the bedroll or any particular revolution of the bedroll. In that way, it is possible to register laser perforation to the bedroll cut-off mechanism.

FIG. 1 shows a perspective view of one embodiment of the invention in which a series of lasers or a laser array 27 is comprised of a row of individual lasers 13–19. The lasers 13–19 are mounted upon frame 12 and are oriented to project a light beam generally downward upon a web 11 which is moving and supported by a carrier fabric 10. This particular example employs carrier fabric 10, but it should be recognized that other mechanisms for supporting the web may be employed, including but not limited to air foils, rollers, and other structures capable of moving and supporting web 11. An air foil creates a high speed current of air that is capable of suspending a web 11 for cutting or severing. Rollers could include a series of spaced rotating members that support a web 11 in a processing system. Many different types of web conveying means may be employed, and the invention is not limited by the type of web conveying means used.

The machine direction is shown by arrow 28 in FIG. 1. A plurality of zones are provided in the cross direction of the web 11, shown as zones 29a–g.

Each successive laser 13–19 in the array 27 is adapted for providing a light beam upon a corresponding zone of the web. For example, laser 13 provides a light beam 20 directed towards zone 29a, and emits the light beam 20 upon the surface of web 11 within zone 29a. The light beam 20 may be emitted upon the surface of the web 11 at an angle, as further shown in FIG. 2. Thus, multiple light beams 20–26 are applied to multiple zones 29a–g, respectively. The light beams 20–26 may be constant, thereby forming a solid line of severance, in the case of severing the web completely. Alternately, they may be intermittent, in the case of perforating the web.

It is possible to provide intermittent perforations upon a web surface by using a rotating disk member having openings, a pulsating laser or other means for providing intermittent bursts of light energy onto the web. A disk may be connected to the front portion of the laser (not shown in FIG. 1), and rotated at high speed to provide intermittent bursts of radiant light beams 20–26 upon the surface of the web 11. In this way, it is possible to perforate the web 11 by "burning" or tracing a dashed line across the web 11.

Figure 2:
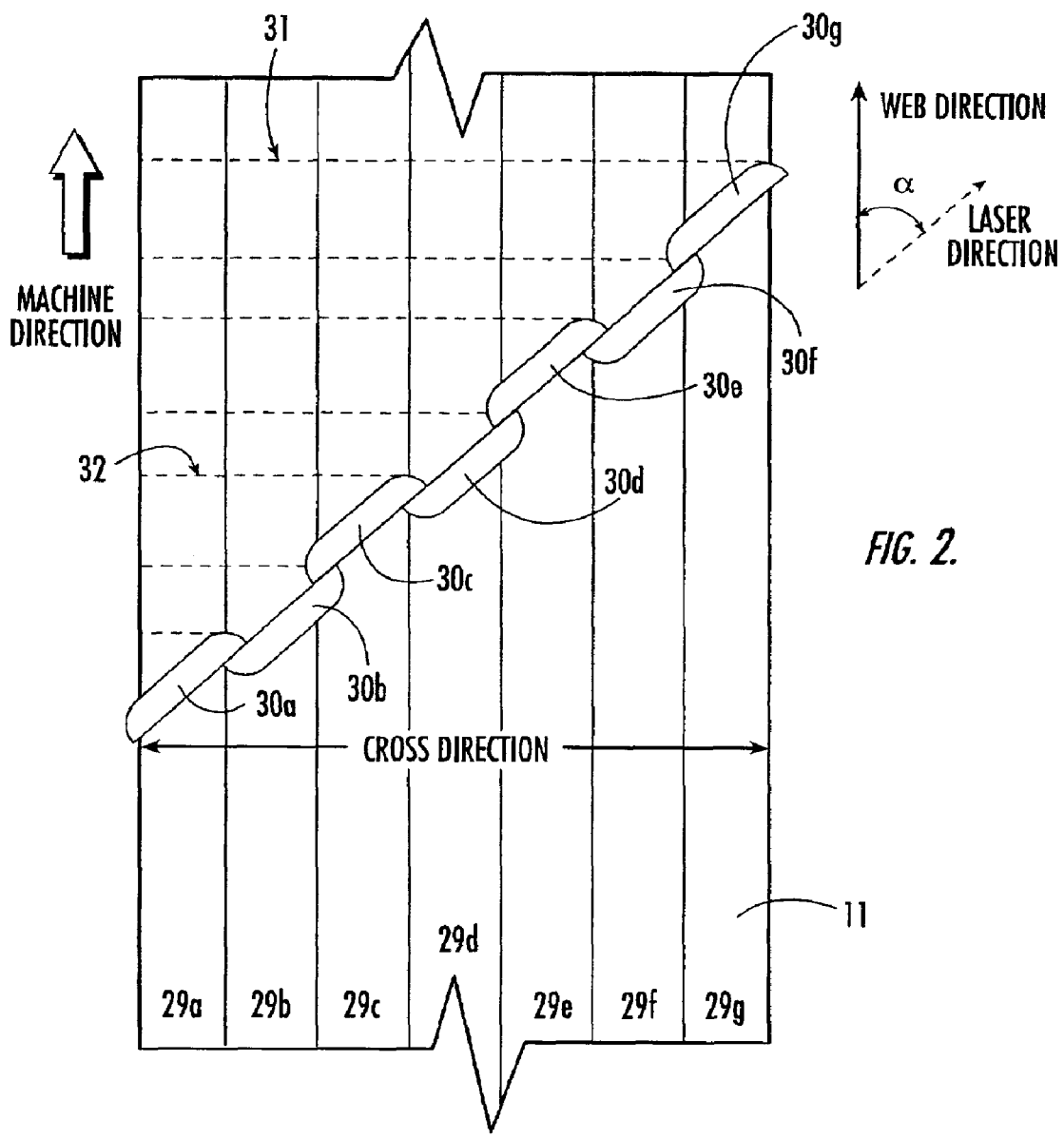
FIG. 2 is a top view of a web showing zones aligned in the machine direction adapted to receive light beams from respective lasers in a laser array.

In FIG. 2, a top view of a web 11 shows zones 29a–g extending from the left to right in the Figure, aligned in the cross direction of the web 11. Each zone 29a–g is associated with respective modules 30a–g, which provide target areas for laser light. In some cases, the modules 30a–g are about 20 inches in length, and overlap as shown in FIG. 2. The modules 30a–g refer to the bounded area or zone upon which the individual laser and motion control systems act in achieving the cutting of a specific section of the web 11. When connected, severed portions may form a completed perforation 31, for example. Alternately, severance of the web 11 can be accomplished.

With reference to FIG. 2, the light beam is angled generally in the cross direction (but usually not perpendicular to) the web 11 such that the time it requires the light beam 20 to be redirected from one edge of zone 29a to the opposite edge of zone 29a accounts for movement of the web 11 in its direction of travel. Thus, the laser direction angle ($\alpha$) (alpha) employed is chosen to achieve a straight and substantially perpendicular perforation line at a given web processing speed for the web 11.

The bond pattern that may be employed in the perforations in the practice of the perforations in the invention varies from a maximum of 110 bonds for each 4.5 inches to a minimum of 9 bonds per 4.5 inches of web width. The bond width may include a minimum of 0.010 inches, and a maximum of 0.060 inches. In general, the distance between perforations (in the machine direction) is a minimum of about 3.5 inches, and a maximum of about 15 inches, although it is clearly possible to deviate from this range (i.e.: less than 3.5 or more than 15 inches). The distance between perforations usually must be within about 0.005 inches of the target sheet length in order to satisfy quality control standards. The overall roll length must be within about 0.005 inches of the target from log to log, for most applications. The perforation lines 31 in general should be straight and substantially perpendicular in the cross direction of the web to insure a clean cut-off across the line of perforation for transfer to a new winding log (winding log not shown).

It is understood by one of ordinary skill in the art that the present discussion is a description of exemplary embodiments only, and is not intended as limiting the broader aspects of the present invention, which broader aspects are embodied in the exemplary constructions. The invention is shown by example in the appended claims.

What is claimed is:

1. A system for perforating a web, the system comprising:
    (a) a web conveying means adapted for supporting and conveying a web, the web having a cross direction bounded by a first edge and a second edge, the web being adapted for travel upon the surface of the web conveying means;
    (b) a frame; and
    (c) at least three lasers mounted upon the frame in an array across the web from the first edge to the second edge, the plurality of lasers being adapted for directing a beam of light upon the surface of the running web to form severed portions that form a perforation in the cross direction of the web, the perforation comprising severed portions and bonded portions in alternating sequence, wherein the lasers provide light beams upon the web at an angle that deviates from the cross direction, but results in a severed portion that is oriented in the cross direction.

2. The system of claim 1 in which the web is apportioned into a plurality of zones, wherein the plurality of lasers are provided in an array across the web from the first edge to the second edge, such that each successive laser in the array is adapted for providing a light beam upon a corresponding yne of the web.

3. The system of claim 2 in which at least seven zones are provided upon the web.

4. The system of claim 2 in which the speed of travel of the web upon the conveying means is greater than about 3,000 feet per minute.

5. The system of claim 2 in which the speed of travel of the web upon the conveying means is greater than about 3,500 feet per minute.

6. The system of claim 2 in which the speed of travel of the web upon the conveying means is greater than about 4,000 feet per minute.

7. The system of claim 2 in which the web conveying means comprises an airfoil.

8. The system of claim 1 in which the web conveying means comprises rollers.

9. The system of claim 1 which the web conveying means comprises a carrier fabric.

10. A system for perforating a web, the system comprising:
    (a) a web conveying means adapted for supporting and conveying a web, the web having a cross direction bounded by a first edge and a second edge, the web being adapted for travel upon the surface of the web conveying means at a speed of greater than about 3,000 feet per minute;
    (b) a frame; and
    (c) at least three lasers mounted upon the frame, the plurality of lasers being adapted for directing a beam of light upon the surface of the running web to form severed portions that form a perforation in the cross direction of the web, the perforation comprising severed portions and bonded portions in alternating sequence, wherein the lasers provide light beams upon the web at an angle that deviates from the cross direction, but results in a severed portion that is oriented in the cross direction.

11. The system of claim 10 in which the web conveying means comprises an air foil.

12. The system of claim 10 in which the web conveying means comprises rollers.

13. The system of claim 10 in which the web conveying means comprises a carrier fabric.

* * * * *

UNITED STATES PATENT AND TRADEMARK OFFICE
CERTIFICATE OF CORRECTION

| | |
|---|---|
| PATENT NO. | : 6,945,922 B2 |
| APPLICATION NO. | : 09/997720 |
| DATED | : September 20, 2005 |
| INVENTOR(S) | : James L. Baggot, Ron F. Gropp and Steve Wojeik |

It is certified that error appears in the above-identified patent and that said Letters Patent is hereby corrected as shown below:

Column 6, line 38 "yne of the web." should read --zone of the web.--

Column 6, line 51 "comprises an airfoil." should read --comprises an air foil.--

Signed and Sealed this

Fifteenth Day of August, 2006

JON W. DUDAS
*Director of the United States Patent and Trademark Office*